L. DECK.
CLOSURE FOR RADIATOR MANIFOLD PIPES.
APPLICATION FILED AUG. 19, 1919.

1,329,700.

Patented Feb. 3, 1920.

INVENTOR.
Lee Deck,
BY
_____
ATTORNEY.

UNITED STATES PATENT OFFICE.

LEE DECK, OF WINFIELD, KANSAS.

CLOSURE FOR RADIATOR MANIFOLD-PIPES.

1,329,700.

Specification of Letters Patent.

Patented Feb. 3, 1920.

Application filed August 19, 1919. Serial No. 318,529.

*To all whom it may concern:*

Be it known that I, LEE DECK, a citizen of the United States of America, and resident of Winfield, in the county of Cowley and State of Kansas, have invented certain new and useful Improvements in Closures for Radiator Manifold-Pipes, of which the following is a specification.

This invention relates to attachment for automobile radiator water circulating manifolds to be employed for closing the ends of said manifolds for testing the radiator. By use of this device escape of the contents of the radiator may be prevented.

An object of this invention is to produce a novel device adapted to be attached to the manifolds of a radiator, novel means being provided for sealing or closing the ends of the manifolds for confining the fluid as stated.

A still further object of this invention is to produce a device having a binding-screw and an element coacting therewith, having a binding-screw engaging member, which will withstand wear incident to the manipulation of the said binding-screw.

A still further object of the invention is to produce a device of this character which can be readily attached to a pipe or manifold or removed therefrom, and which will have such strength as to permit the sealing member to press against the end of the pipe or manifold.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views and in which—

Figure 1:
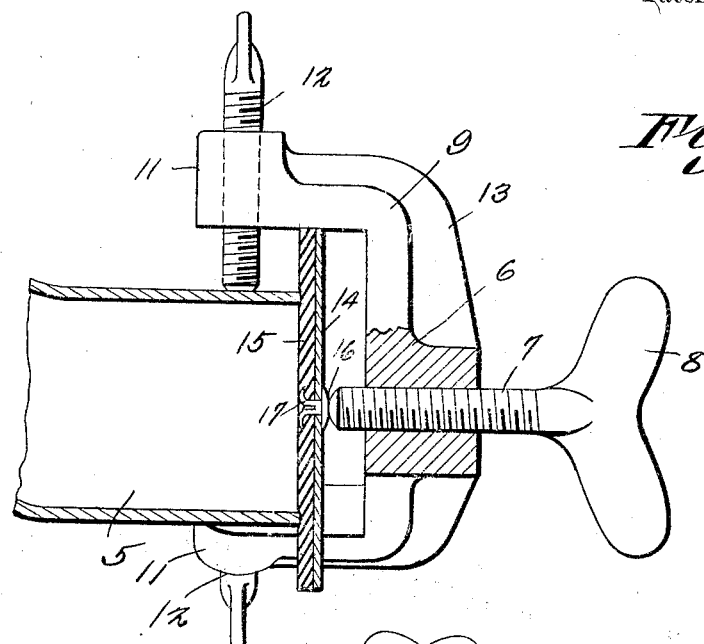
Figure 2:
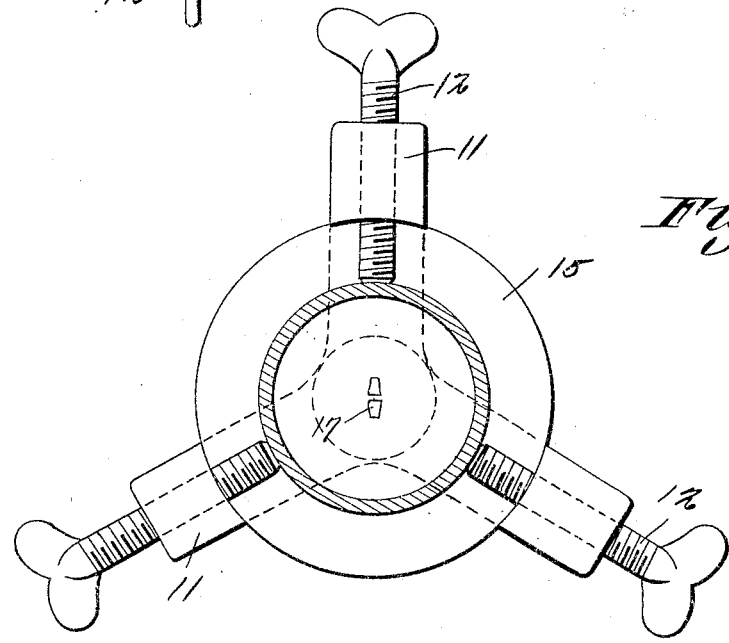

Figure 1 illustrates sectional view of a pipe showing the device embodying the invention applied thereto, the said device being shown partly in section and partly in elevation; and Fig. 2 illustrates a sectional view of the line 2—2 of Fig. 1.

In these drawings 5 denotes a fragment of a circulating pipe or manifold. A clamping member comprises an apertured body 6, the wall of the aperture being threaded to engage the threads of a binding-screw 7, which is preferably provided with a winged head 8 to facilitate the manipulation of the said screw. The body 6 has arms 9, preferably three in number, each arm terminating in a hollow boss 11, the said boss being internally threaded to engage the screw 12, which aids in holding the clamping member to the manifold, three of the said screws (one on each arm) being effective to retain the said clamping member in position. Each arm is preferably provided with a rib 13 to increase its strength, and the clamping member is adapted to coact with a closure for the end of the manifold 5.

In this embodiment of the invention the closure comprises a plate 14, which is preferably metal or some relatively rigid material, and the said plate has a facing 15 of rubber, leather, or other slightly yielding material, which can be pressed against the end of the pipe to seal the same. The facing 15 is preferably a disk the shape of the plate 14, and the plate and disk are held together by a rivet having a head 16 and a split shank 17, the prongs of which pass through the plate and are embedded in the disk 15.

The head 16 is of such area and thickness as to form an abutment for the end of the screw, and the said rivet is of a material which is relatively hard, so that the head will withstand friction incident to the rotation of the end of the screw on the said head.

The body of the clamp may be manufactured inexpensively by the malleable casting process, and the cost of supplying the other parts thereof will be comparatively small.

As the drawing well illustrates the relation of parts, further detailed description of the operation is believed to be unnecessary.

I claim—

1. In a closure for radiator manifold pipes, a clamping member having arms terminating in hollow bosses, screws threaded in the said bosses and adapted to engage the outer surface of a pipe, a clamping screw threaded through the body of the clamping member, a disk having a yieldable face, and a device for fastening the plate and yieldable face together, consisting of a headed member extending through the said plate and embedded in the flexible member.

2. In a device for closing the ends of radiator manifolds, a body having arms terminating in hollow bosses, binding-screws threaded in the said bosses and adapted to engage the sides of a pipe, the said body having a threaded aperture, a binding-screw threaded in the said aperture, a plate having a yieldable disk adapted to engage the end of the manifold, a headed member extending through the said plate and having its end embedded in the disk, the head of the said headed member being engaged by the end of the binding-screw for holding the parts in assembled relation.

3. In a device for closing the end of radiator manifolds, a clamping member comprising an apertured body, arms radiating therefrom and terminating in hollow bosses, clamping screws embedded in the bosses and bearing against the sides of the manifold, a clamping screw threaded in the aperture of the body, a manifold closure comprising a plate and a yieldable face, a fastening device comprising a head having a split shank, the said shank extending through the plate and having its ends embedded in the disk, the head of said fastening device being in alinement with and engaged by the end of the clamping screw whereby the said closure is held in operative position.

LEE DECK.